(12) United States Patent
Sallese

(10) Patent No.: US 11,880,299 B2
(45) Date of Patent: Jan. 23, 2024

(54) CALENDAR BASED FLASH COMMAND SCHEDULER FOR DYNAMIC QUALITY OF SERVICE SCHEDULING AND BANDWIDTH ALLOCATIONS

(71) Applicant: INTERNATIONAL BUSINESS MACHINES CORPORATION, Armonk, NY (US)

(72) Inventor: Kevin E. Sallese, Fushear, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 17/686,017

(22) Filed: Mar. 3, 2022

(65) Prior Publication Data

US 2023/0281115 A1 Sep. 7, 2023

(51) Int. Cl.
*G06F 12/02* (2006.01)
*G06F 12/126* (2016.01)
*G06F 12/0882* (2016.01)
*G06F 9/48* (2006.01)

(52) U.S. Cl.
CPC ...... *G06F 12/0246* (2013.01); *G06F 12/0253* (2013.01); *G06F 12/0882* (2013.01); *G06F 12/126* (2013.01); *G06F 9/4881* (2013.01); *G06F 2212/7201* (2013.01)

(58) Field of Classification Search
CPC ............ G06F 12/0246; G06F 12/0253; G06F 12/0882; G06F 12/126; G06F 9/4881; G06F 2212/7201
See application file for complete search history.

(56) References Cited

U.S. PATENT DOCUMENTS

| | | | |
|---|---|---|---|
| 6,732,199 B1* | 5/2004 | Yu | H04L 47/50 710/39 |
| 2004/0062261 A1* | 4/2004 | Zecharia | H04L 47/50 370/395.3 |
| 2005/0071505 A1* | 3/2005 | Grosbach | H04L 47/24 709/228 |
| 2007/0239398 A1* | 10/2007 | Song | G06F 1/324 702/182 |
| 2011/0093913 A1* | 4/2011 | Wohlert | H04L 63/0861 726/1 |
| 2020/0081652 A1* | 3/2020 | Nukala | G06F 3/0659 |
| 2020/0278941 A1* | 9/2020 | Bavishi | G06F 13/161 |
| 2022/0091986 A1* | 3/2022 | Kotra | G06F 9/4881 |
| 2022/0197563 A1* | 6/2022 | Lam | G06F 3/0679 |

* cited by examiner

*Primary Examiner* — Tasnima Matin
(74) *Attorney, Agent, or Firm* — KONARD RAYNES DAVDA & VICTOR LLP; Rabindranath Dutta

(57) ABSTRACT

Provided are a method, an apparatus, and a memory controller coupled to a plurality of storage dies, wherein the memory controller implements logic to perform operations with respect to the storage dies, the operations comprising: maintaining a calendar based scheduling mechanism that is programmed by a firmware to support a quality of service scheduling in a solid state drive in which the memory controller is included; and determining, by a flash command scheduler, from the calendar based scheduling mechanism, which traffic class to service.

20 Claims, 7 Drawing Sheets

CALENDAR BASED FLASH COMMAND SCHEDULER FOR DYNAMIC QUALITY OF SERVICE SCHEDULING AND BANDWIDTH ALLOCATIONS

BACKGROUND

The disclosure relates to a calendar based flash command scheduler for dynamic quality of service scheduling and bandwidth allocations.

A solid state drive (SSD) is a data storage device that uses integrated circuit assemblies as memory to store data persistently. SSDs have no moving mechanical components and this distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and comprise a type of non-volatile storage technology, and such types of SSDs are referred to as flash storage devices. A requirement of SSDs may be to ensure that read and/or write commands and other commands are serviced in a reliable amount of time, and the performance of command latencies may be provided by a quality of service (QoS) metric. For example, a movie stored in a SSD in a laptop may have to be read and the QoS metric may be associated with the reading. QoS metrics may also be provided for internal operations such as garbage collection within a SSD.

The quality of service of an SSD may be related to the predictability of low latency and consistency of high input/output operations per second (IOPS) while servicing read/write input/output (I/O) and other workloads that may be internally generated with the SSD.

Solid state storage devices (for example, SSDs) may be comprised of one or more packages of non-volatile memory dies implementing NAND memory cells, where each die is comprised of storage cells. Storage cells are organized into pages and pages are organized in blocks, and the blocks are stored in planes of a storage die. In NAND flash memory devices, pages cannot be updated without the entire block of pages being erased and the data written to a new location. To free up blocks of pages, the pages having valid data being used on a block need to be consolidated and written to a new block to fill up all the pages on that new block, and the blocks previously storing the dispersed pages may then be erased to make available for new data. Garbage collection, paging, etc., and other mechanisms are used for management of memory, page tables, etc., in SSDs.

SUMMARY OF THE PREFERRED EMBODIMENTS

Provided are a method, an apparatus, and a memory controller coupled to a plurality of storage dies, wherein the memory controller implements logic to perform operations with respect to the storage dies, the operations comprising: maintaining a calendar based scheduling mechanism that is programmed by a firmware to support a quality of service scheduling in a solid state drive in which the memory controller is included; and determining, by a flash command scheduler, from the calendar based scheduling mechanism, which traffic class to service.

In certain embodiments, the calendar based scheduling mechanism is maintained in a predetermined number of entries of a Random Access Memory (RAM), wherein each entry of the predetermined number of entries of the RAM indicates a traffic class or is null.

In further embodiments, the predetermined number of entries of the RAM indicate traffic classes selected from: a recirc read command; a low priority read command; a medium priority read command; a high priority read command; and a write command.

In yet further embodiments, the recirc read command is for performing garbage collection in the solid state drive.

In additional embodiments, in response to initialization of the calendar based scheduling mechanism, the flash command scheduler cycles through RAM addresses corresponding to the entries to determine which traffic class is up for service.

In yet additional embodiments, system metrics based on which the calendar based scheduling mechanism is programmed include host to recirc bandwidth, number of logical to physical transfer misses, and an entry manager queue depth, in a page based storage of data in the solid state drive.

In further embodiments, the memory controller is included in the solid state drive, wherein the plurality of storage dies comprise NAND devices.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A Flash Command Scheduler (FCS) is a part of flash storage devices and in large part, determines the overall Bandwidth (BW) and efficiency that may be obtained in the flash devices. The flash command scheduler is responsible for the scheduling order for all commands (read, write, erase, etc.) sent to, or processed, within a flash storage device, such as a NAND-based SSD.

Functionality of a flash command scheduler may be further broken down in two functions: (1) schedule commands with priority based on current system needs; and (2) ensuring that multi-die targets in flash devices are utilized in the most efficient way possible to avoid blocking.

Certain embodiments introduce Calendar Based Scheduling (CBS) to solve dynamic Quality of Service (QOS) scheduling. In particular, certain embodiments provide mechanisms for the application of calendar based scheduling to facilitate dynamic control of bandwidth for specific command flows based on priority, as the drive experiences different states of operation such as garbage collection, paging, and error handling. These different states desire dynamic bandwidth adjustments and allocations per traffic flow in real-time to maintain a consistent balanced use of flash resources and reduced latency for critical flows such as paging. As a result, improvements are provided in the operations of a SSD and to operations of computing devices that include or manage SSDs.

Exemplary Embodiments

Figure 1:
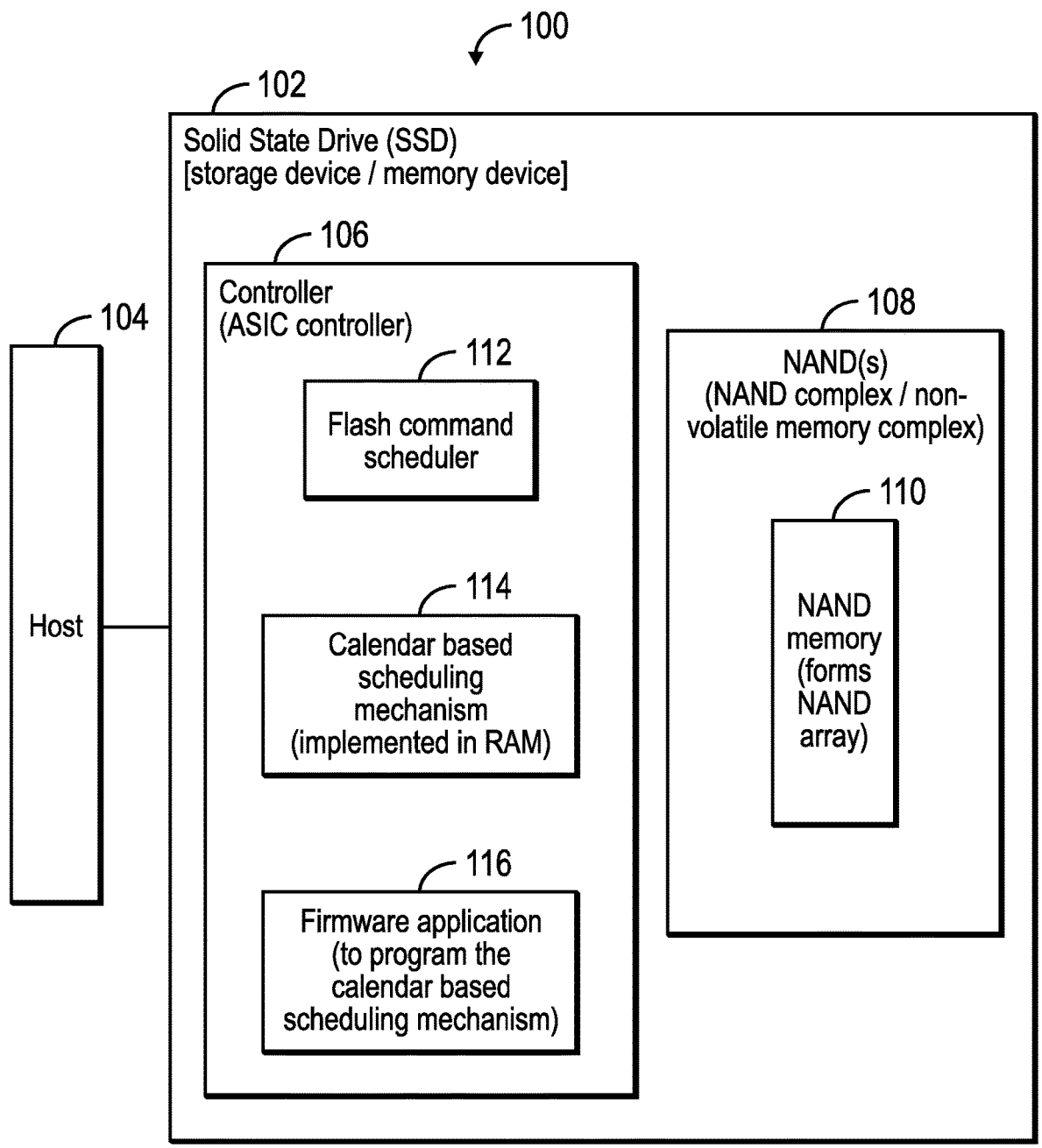
FIG. 1 illustrates a block diagram of a computing environment in which a solid state drive is coupled to a host, in accordance with certain embodiments.

FIG. 1 illustrates a block diagram of a computing environment 100 in which a solid state drive 102 is coupled to a host 104, in accordance with certain embodiments.

The solid state drive 102 includes a controller 106 and a NAND complex 108 comprised of NAND memory 110 that forms a NAND array. The controller 106 may comprise an Application Specific Integrated Circuit (ASIC) controller, and may include a flash command scheduler 112, a calendar based scheduling mechanism 114 implemented in Random Access Memory (RAM) and a firmware application 116 to program the calendar based scheduling mechanism 114.

The non-volatile memory storage device 102 comprising the SSD may function as both a memory device and/or a storage device in a computing system, and may be used to perform the role of volatile memory devices and non-volatile storage media in a computing system.

In one embodiment, the storage device 102 (also referred to as memory device) may comprise a block addressable memory device, such as those based on NAND or NOR technologies. The memory device may use a two-dimensional or three-dimensional NAND array. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

A host interface may couple the non-volatile memory storage device 102 to a host system 104. The non-volatile memory storage device 102 may be installed or embedded within the host system 104, or the non-volatile memory storage device 102 may be external to the host system 104. The host interface may comprise a bus interface, such as a Peripheral Component Interconnect Express (PCIe) interface, Serial AT Attachment (SATA), Non-Volatile Memory Express (NVMe), etc.

A garbage collection process may be used with the SSD 102 to consolidate valid data written to pages in the memory device to a new page because flash memory is erased before it can be rewritten. Rewriting data in the flash memory requires pages of data to be read, updated, and written to a new location because data cannot be rewritten in place. The page having the source of the data copied to the new location may then be erased and reused.

In certain embodiments, the host 104 may be comprised of any suitable computational device, such as a personal computer, a mainframe, a telephony device, a smart phone, a storage controller, a blade computer, a processor with memory, etc. The controller 106 may be implemented in Application Specific Integrated Circuit (ASIC) and/or firmware, software, or any combination thereof.

Figure 2:
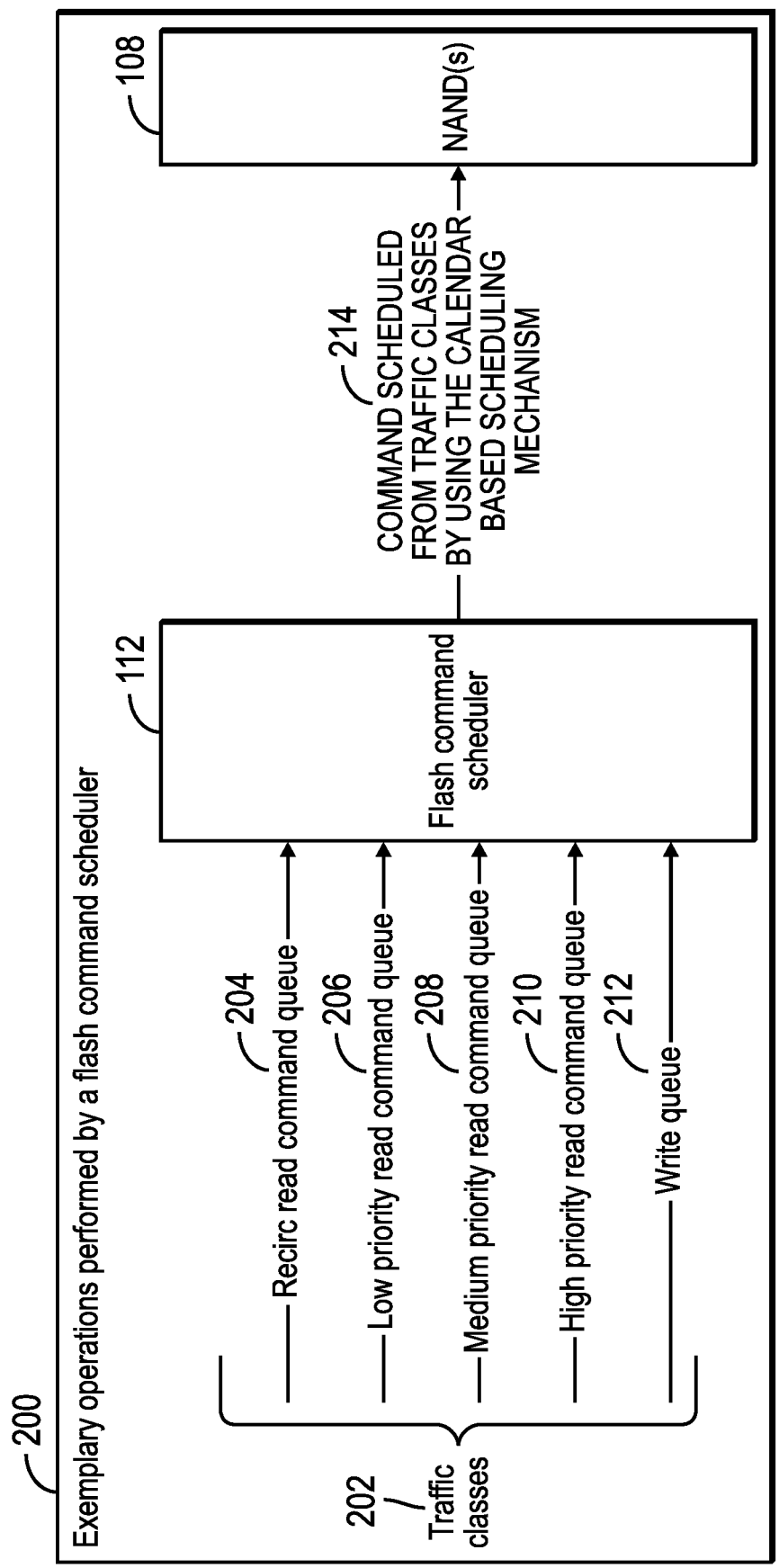
FIG. 2 illustrates a block diagram that shows exemplary operations performed by a flash command scheduler, in accordance with certain embodiments.

FIG. 2 illustrates a block diagram 200 that shows exemplary operations performed by a flash command scheduler 112, in accordance with certain embodiments.

The flash command scheduler 112 may have a plurality of input queues, where each input queue is traffic class. For example, in FIG. 2, queues of five exemplary traffic classes are shown. The five exemplary traffic classes shown are:
(1) Recirc read command queue 204;
(2) Low priority read command queue 206;
(3) Medium priority read command queue 208;
(4) High priority read command queue 210; and
(5) Write queue 212.

The recirc read commands are commends generated during garbage collection within the SSD 102. The other read commands in queues 206, 208, 210 may have different priorities, and the write queue 212 includes write commands.

The flash command scheduler 112 schedules commands from the traffic classes 202 included in the queues 204, 206, 208, 210, 212 by using the calendar based scheduling mechanism 114 (as shown via reference numeral 214) to ensure appropriate quality of service based on overall bandwidth and efficiency while using the NANDs 108.

Figure 3:
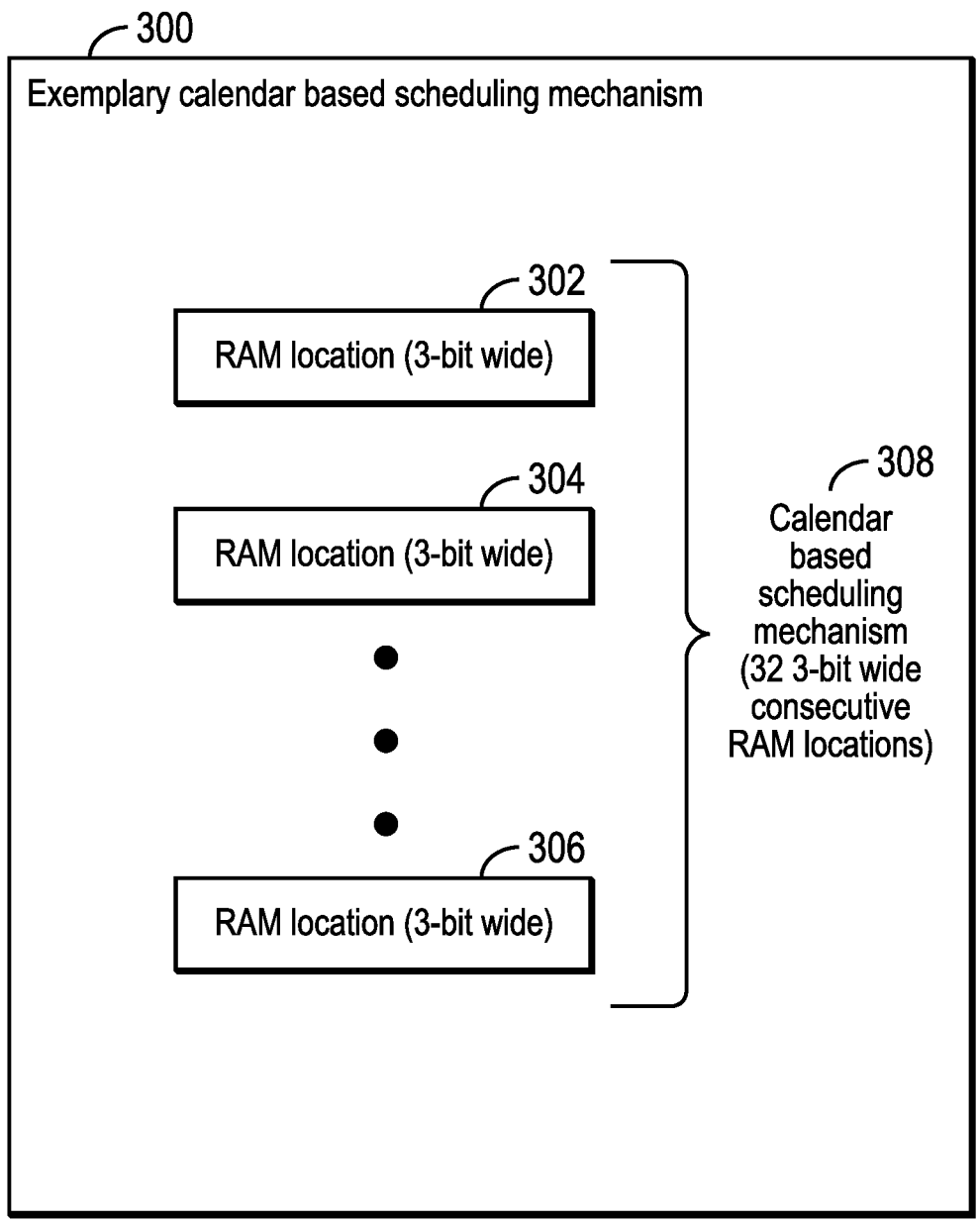
FIG. 3 illustrates a block diagram that shows an exemplary calendar based scheduling mechanism, in accordance with certain embodiments.

FIG. 3 illustrates a block diagram 300 that shows an exemplary calendar based scheduling mechanism 114, in accordance with certain embodiments.

The calendar based scheduling mechanism 114 may be programed, on-the-fly, by firmware (e.g., firmware application 116) to support dynamic quality of service command scheduling and bandwidth allocations on a per-traffic flow basis. The calendar is implemented in RAM and each location of the RAM is programmed with a traffic class (TC). For the example shown in FIG. 3, the RAM has 32 locations (shown via reference numerals 304, 304, 306 and reference numeral 308), each 3-bits wide, and therefore capable of supporting up to 8 traffic classes (although the example provided in this disclosure describe 5 traffic classes). There are no restrictions on whether or not RAM locations contains any given traffic class. Additionally, the length of calendar is programmable up to the maximum number of locations (in this example, 32). Once the Calendar RAM (CAL RAM 302, 304, 306) is initialized, the flash command scheduler 112 cycles thru the RAM addresses in order to determine which traffic class is up for service.

Figure 4:
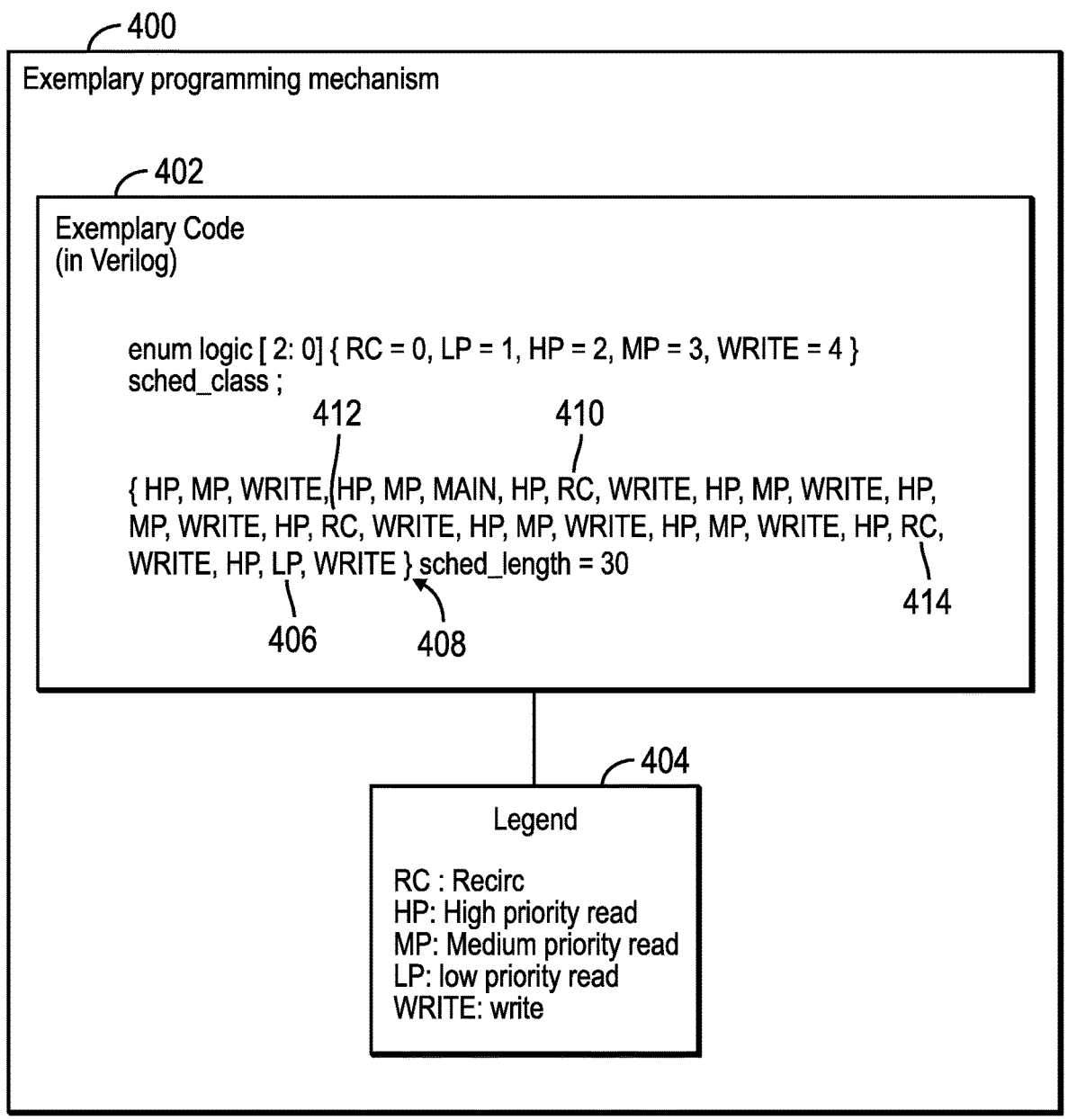
FIG. 4 illustrates a block diagram that shows an exemplary programming mechanism, in accordance with certain embodiments.

FIG. 4 illustrates a block diagram 400 that shows an exemplary programming mechanism, in accordance with certain embodiments.

The exemplary code 402 is expressed in Verilog code for an example with thirty entries in the RAM. There are 5 traffic classes: RC=Recirc Read Command, LP=Low Priority Read Command, MP=Medium Priority Read Command, HP=High Priority Read Command, and WRITE=Write Command, as shown via the legend 404.

In the code 402, all traffic classes are represented but with varying degrees of bandwidth allocation. LP 406 for example appears only once and therefore has 1/30 of scheduling bandwidth as there are 30 entries (reference numeral 408). RC appears three times (reference numeral 410, 412, 414) and therefore has 3/30 of overall bandwidth. As conditions change on the drive, allocations can be changed on-the-fly by increasing or decreasing the number of entries in the RAM for any given traffic class. Dummy slots may be used to simply increase or decrease bandwidth by keeping certain entries NULL or empty.

Figure 5:
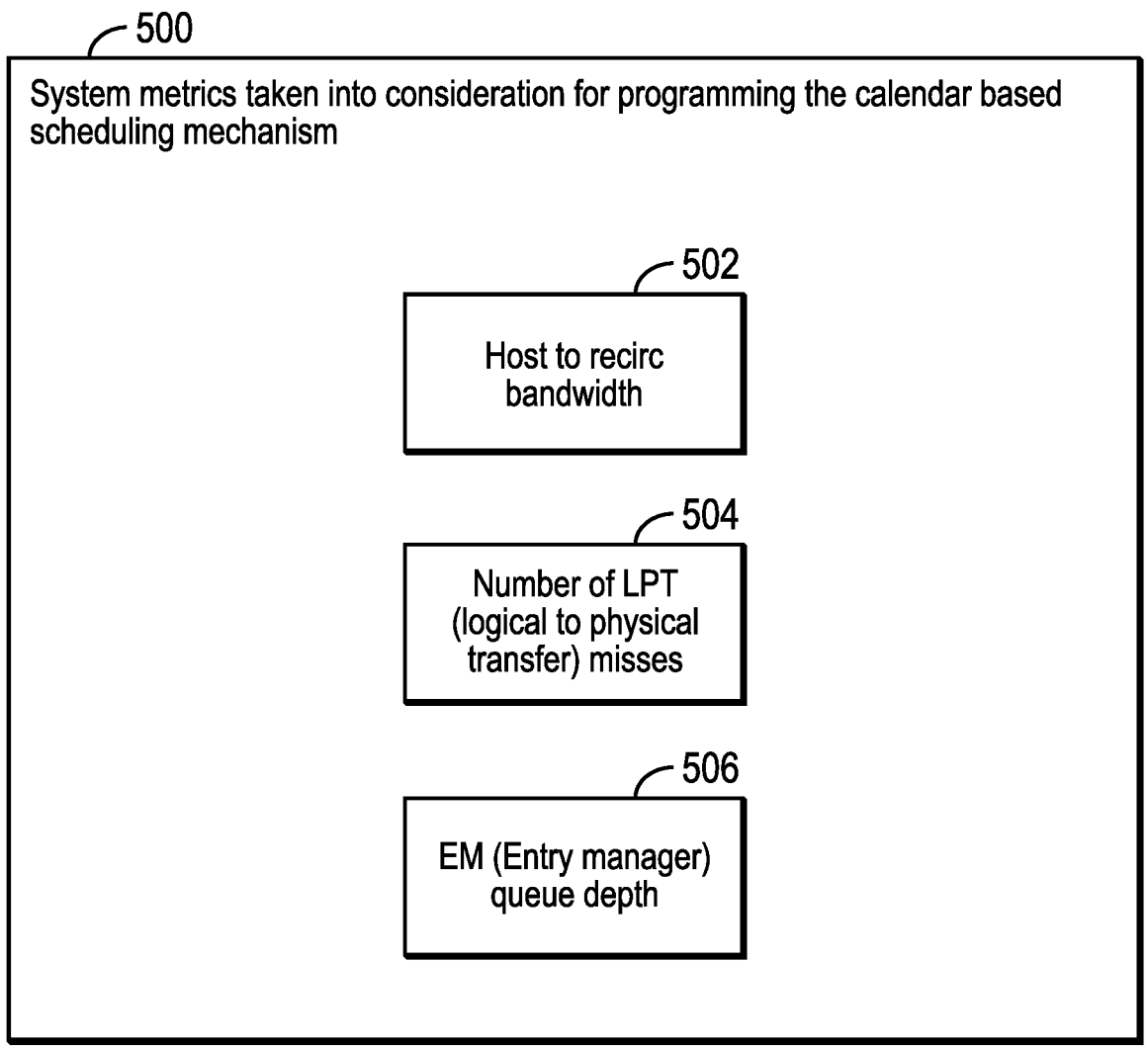
FIG. 5 illustrates a block diagram that shows system metrics taken into consideration for programming the calendar based scheduling mechanism, in accordance with certain embodiments.

FIG. 5 illustrates a block diagram 500 that shows system metrics taken into consideration for programming the calendar based scheduling mechanism 114 in accordance with certain embodiments.

The command based scheduling provides a way to reduce the schedule counts (number of commands each schedule) for each traffic class so that the flash command scheduler 112 may break out and make new decisions on the next class more often, based on more recent system conditions. A closed loop control scheduler taking into consideration a number of system metrics [host to recirc bandwidth 502, number of logical to physical transfer (LPT) misses, Entry Manager (EM) queue depth, etc.] may be used to dynamically optimize scheduling as traffic flows and drive conditions change. The LPT misses and EM queue depth are found in page based data storage systems in which not all page of the page table for page management may be stored at the same time in the DDR memory.

Figure 6:
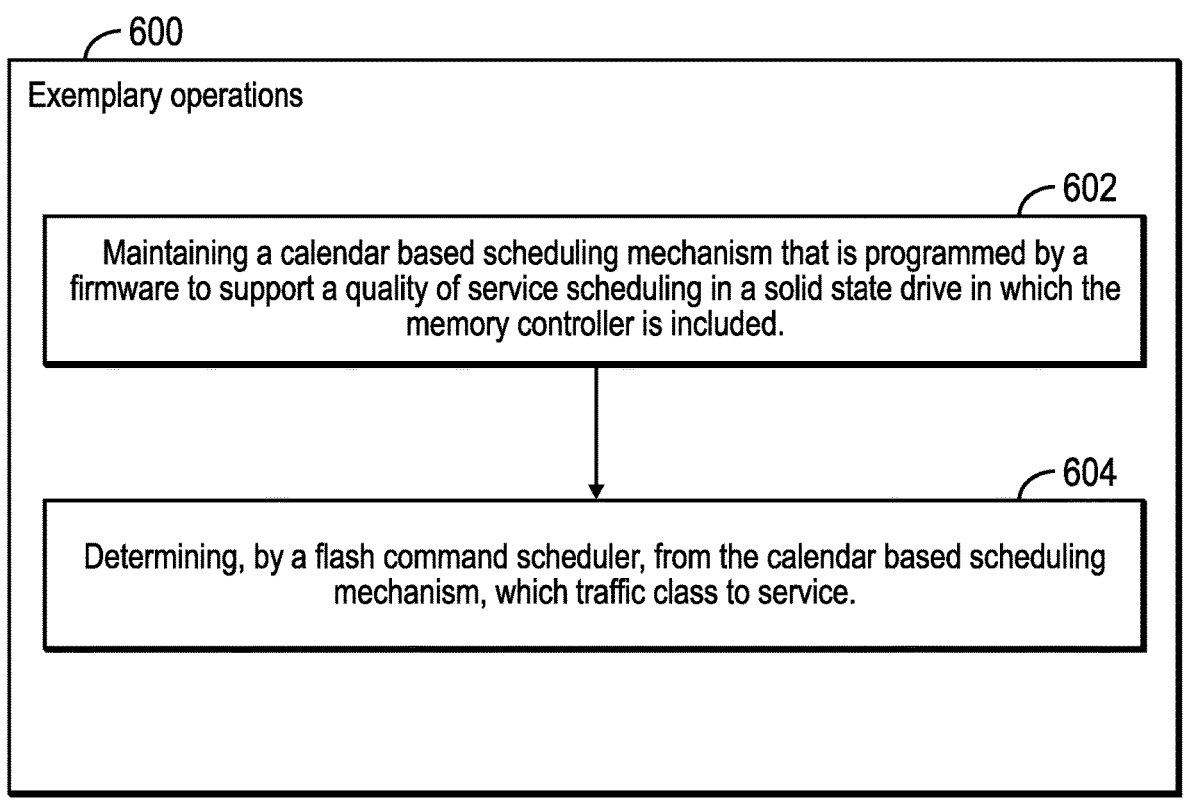
FIG. 6 illustrates a flowchart that shows operations for a calendar based flash command scheduler for dynamic quality of service scheduling and bandwidth allocations, in accordance with certain embodiments.

FIG. 6 illustrates a flowchart 600 that shows operations for a calendar based flash command scheduler 112 for dynamic quality of service scheduling and bandwidth allocations, in accordance with certain embodiments.

Control starts at block 602 in which a calendar based scheduling mechanism 114 is maintained, where the calendar based scheduling mechanism 114 is programmed by a firmware 116 to support a quality of service scheduling in a solid state drive 102 in which the memory controller 106 is included. Control proceeds to block 604 in which a flash command scheduler 112 determines from the calendar based scheduling mechanism 114 which traffic class to service.

Therefore, FIGS. 1-6 illustrate certain embodiments that implement a calendar based flash command scheduler for dynamic quality of service scheduling and bandwidth allocations.

Additional Embodiment Details

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 7:
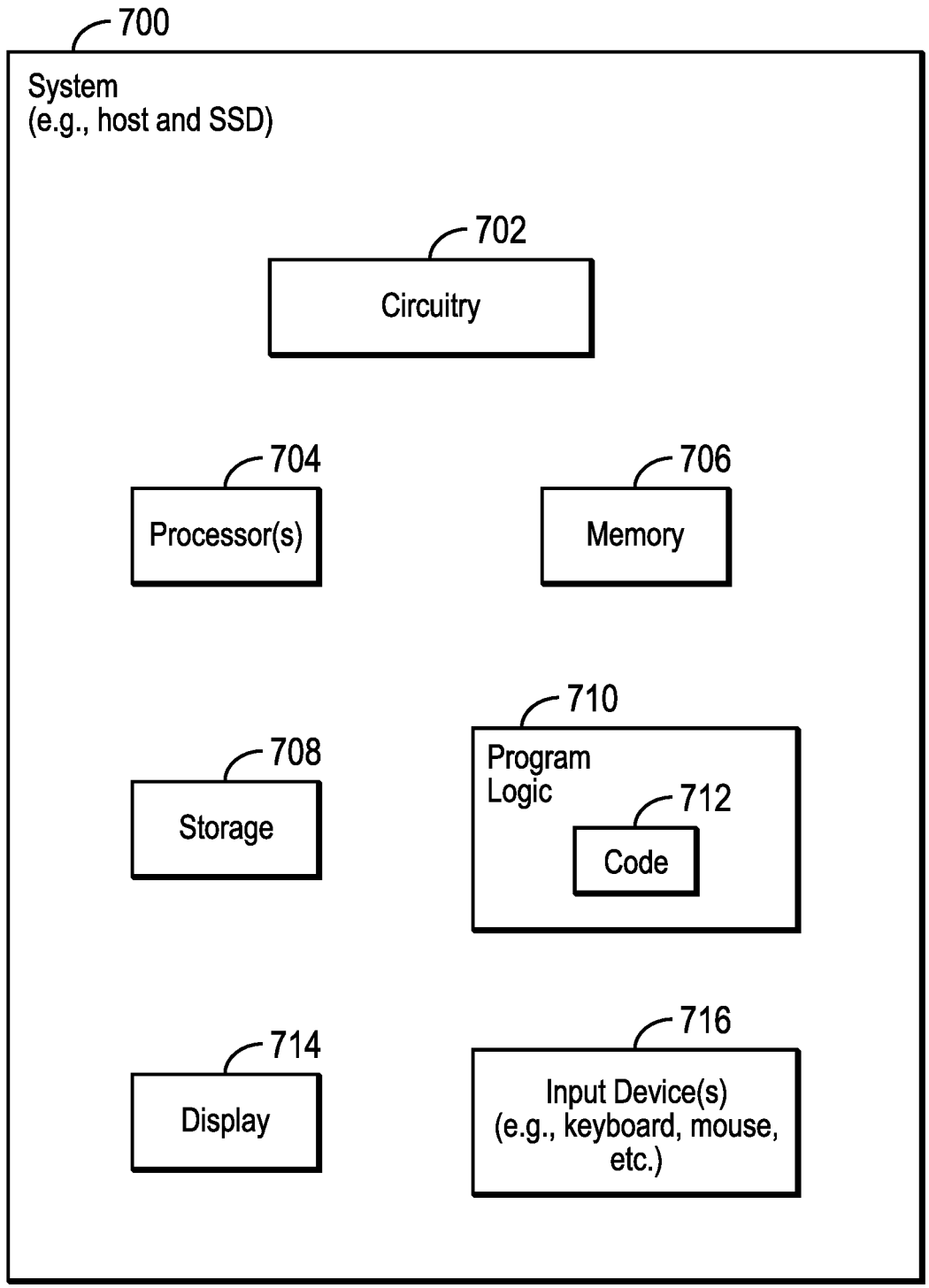
FIG. 7 illustrates a block diagram of a system, in accordance with certain embodiments.

FIG. 7 illustrates a block diagram of a system 700 that includes both the host 104 (the host 104 comprises at least a processor) and the solid state drive 102, in accordance with certain embodiments. For example, in certain embodiments the system 700 may be a computer (e.g., a laptop computer, a desktop computer, a tablet, a cell phone or any other suitable computational device) that has the host 104 and the solid state drive 102 both included in the system 700. For example, in certain embodiments the system 700 may be a laptop computer that includes the solid state drive 102. The system 700 may include a circuitry 702 that may in certain embodiments include at least a processor 704. The system 700 may also include a memory 706 (e.g., a volatile memory device), and storage 708. The storage 708 may include the solid state drive 102 or other drives or devices including a non-volatile memory device (e.g., EEPROM, ROM, PROM, flash, firmware, programmable logic, etc.). The storage 708 may also include a magnetic disk drive, an optical disk drive, a tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702. The system 700 may also include a display 714 (e.g., an liquid crystal display (LCD), a light emitting diode (LED) display, a cathode ray tube (CRT) display, a touchscreen display, or any other suitable display). The system 700 may also include one or more input devices 716, such as, a keyboard, a mouse, a joystick, a trackpad, or any other suitable input devices). Other components or devices beyond those shown in FIG. 7 may also be found in the system 700.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A memory controller coupled to a plurality of storage dies, wherein the memory controller implements logic to perform operations with respect to the storage dies, the operations comprising:
   maintaining a calendar based scheduling mechanism that is programmed by a firmware to support a quality of service scheduling in a solid state drive in which the memory controller is included; and
   determining, by a flash command scheduler, from the calendar based scheduling mechanism, which traffic class to service, wherein system metrics based on which the calendar based scheduling mechanism is programmed include host to recirc bandwidth, and wherein s recirc read command is for performing garbage collection in the solid state drive.

2. The memory controller of claim 1, wherein the calendar based scheduling mechanism is maintained in a predetermined number of entries of a Random Access Memory (RAM), wherein each entry of the predetermined number of entries of the RAM indicates a traffic class or is null, and wherein a bandwidth for a selected traffic class is proportional to how many times the selected traffic class appears as entries in the RAM.

3. The memory controller of claim 2, wherein the predetermined number of entries of the RAM indicate traffic classes selected from:
   a recirc read command;
   a low priority read command;
   a medium priority read command;
   a high priority read command; and
   a write command.

4. The memory controller of claim 2, wherein
   in response to initialization of the calendar based scheduling mechanism, the flash command scheduler cycles through RAM addresses corresponding to the entries to determine which traffic class is up for service.

5. The memory controller of claim 2, wherein the system metrics based on which the calendar based scheduling mechanism is programmed include number of logical to physical transfer misses, and an entry manager queue depth, in a page based storage of data in the solid state drive.

6. The memory controller of claim 2, wherein a calendar used by the calendar based scheduling mechanism is stored in the RAM, and wherein the flash command scheduler cycles through RAM addresses in order to determine which traffic class is up for service, and wherein dummy slots are used to adjust bandwidth by keeping selected entries in the RAM empty.

7. The memory controller of claim 1, wherein the memory controller is included in the solid state drive, and wherein the plurality of storage dies comprise NAND devices.

8. An apparatus, comprising:
   a non-volatile memory; and
   a memory controller, wherein the memory controller controls the non-volatile memory, and wherein the memory controller performs operations, the operations comprising:
   maintaining a calendar based scheduling mechanism that is programmed by a firmware to support a quality of service scheduling in the apparatus; and
   determining, by a flash command scheduler, from the calendar based scheduling mechanism, which traffic class to service, wherein system metrics based on which the calendar based scheduling mechanism is programmed include host to recirc bandwidth, and wherein s recirc read command is for performing garbage collection in the apparatus.

9. The apparatus of claim 8, wherein the calendar based scheduling mechanism is maintained in a predetermined number of entries of a Random Access Memory (RAM), wherein each entry of the predetermined number of entries of the RAM indicates a traffic class or is null, and wherein a bandwidth for a selected traffic class is proportional to how many times the selected traffic class appears as entries in the RAM.

10. The apparatus of claim 9, wherein the predetermined number of entries of the RAM indicate traffic classes selected from:
 a recirc read command;
 a low priority read command;
 a medium priority read command;
 a high priority read command; and
 a write command.

11. The apparatus of claim 9, wherein
 in response to initialization of the calendar based scheduling mechanism, the flash command scheduler cycles through RAM addresses corresponding to the entries to determine which traffic class is up for service.

12. The apparatus of claim 9, wherein the system metrics based on which the calendar based scheduling mechanism is programmed include number of logical to physical transfer misses, and an entry manager queue depth, in a page based storage of data in the apparatus.

13. The apparatus of claim 9, wherein a calendar used by the calendar based scheduling mechanism is stored in the RAM, and wherein the flash command scheduler cycles through RAM addresses in order to determine which traffic class is up for service, and wherein dummy slots are used to adjust bandwidth by keeping selected entries in the RAM empty.

14. The apparatus of claim 8, wherein the apparatus further comprises a computational device.

15. A method, performed by a memory controller coupled to a plurality of storage dies, wherein the memory controller implements logic to perform operations with respect to the storage dies, the operations comprising:
 maintaining a calendar based scheduling mechanism that is programmed by a firmware to support a quality of service scheduling in a solid state drive in which the memory controller is included; and
 determining, by a flash command scheduler, from the calendar based scheduling mechanism, which traffic class to service, wherein system metrics based on which the calendar based scheduling mechanism is programmed include host to recirc bandwidth, and wherein s recirc read command is for performing garbage collection in the solid state drive.

16. The method of claim 15, wherein the calendar based scheduling mechanism is maintained in a predetermined number of entries of a Random Access Memory (RAM), wherein each entry of the predetermined number of entries of the RAM indicates a traffic class or is null, and wherein a bandwidth for a selected traffic class is proportional to how many times the selected traffic class appears as entries in the RAM.

17. The method of claim 16, wherein the predetermined number of entries of the RAM indicate traffic classes selected from:
 a recirc read command;
 a low priority read command;
 a medium priority read command;
 a high priority read command; and
 a write command.

18. The method of claim 16, wherein
 in response to initialization of the calendar based scheduling mechanism, the flash command scheduler cycles through RAM addresses corresponding to the entries to determine which traffic class is up for service.

19. The method of claim 16 wherein the system metrics based on which the calendar based scheduling mechanism is programmed include number of logical to physical transfer misses, and an entry manager queue depth, in a page based storage of data in the solid state drive.

20. The method of claim 16, wherein a calendar used by the calendar based scheduling mechanism is stored in the RAM, and wherein the flash command scheduler cycles through RAM addresses in order to determine which traffic class is up for service, and wherein dummy slots are used to adjust bandwidth by keeping selected entries in the RAM empty.

* * * * *